No. 769,370. PATENTED SEPT. 6, 1904.
R. C. WRIGHT & F. E. STEBBINS.
CAR TRUCK.
APPLICATION FILED MAR. 18, 1902.
NO MODEL. 5 SHEETS—SHEET 1.
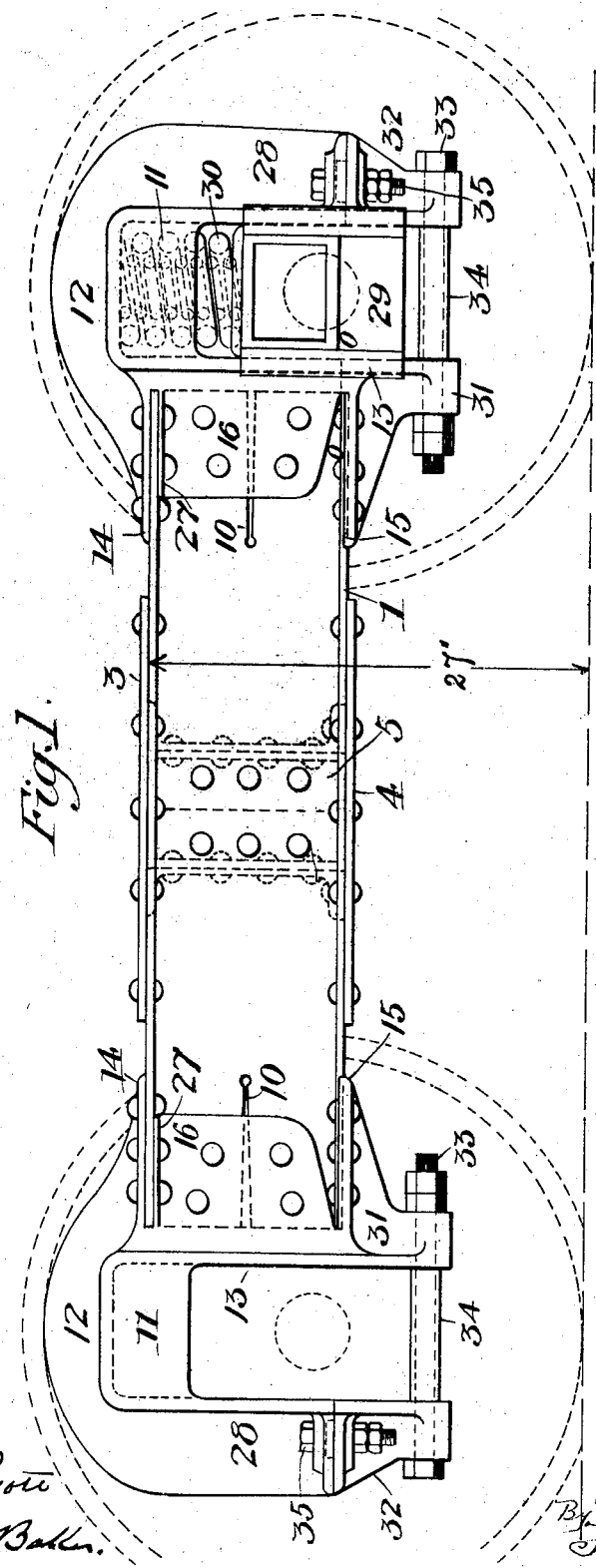

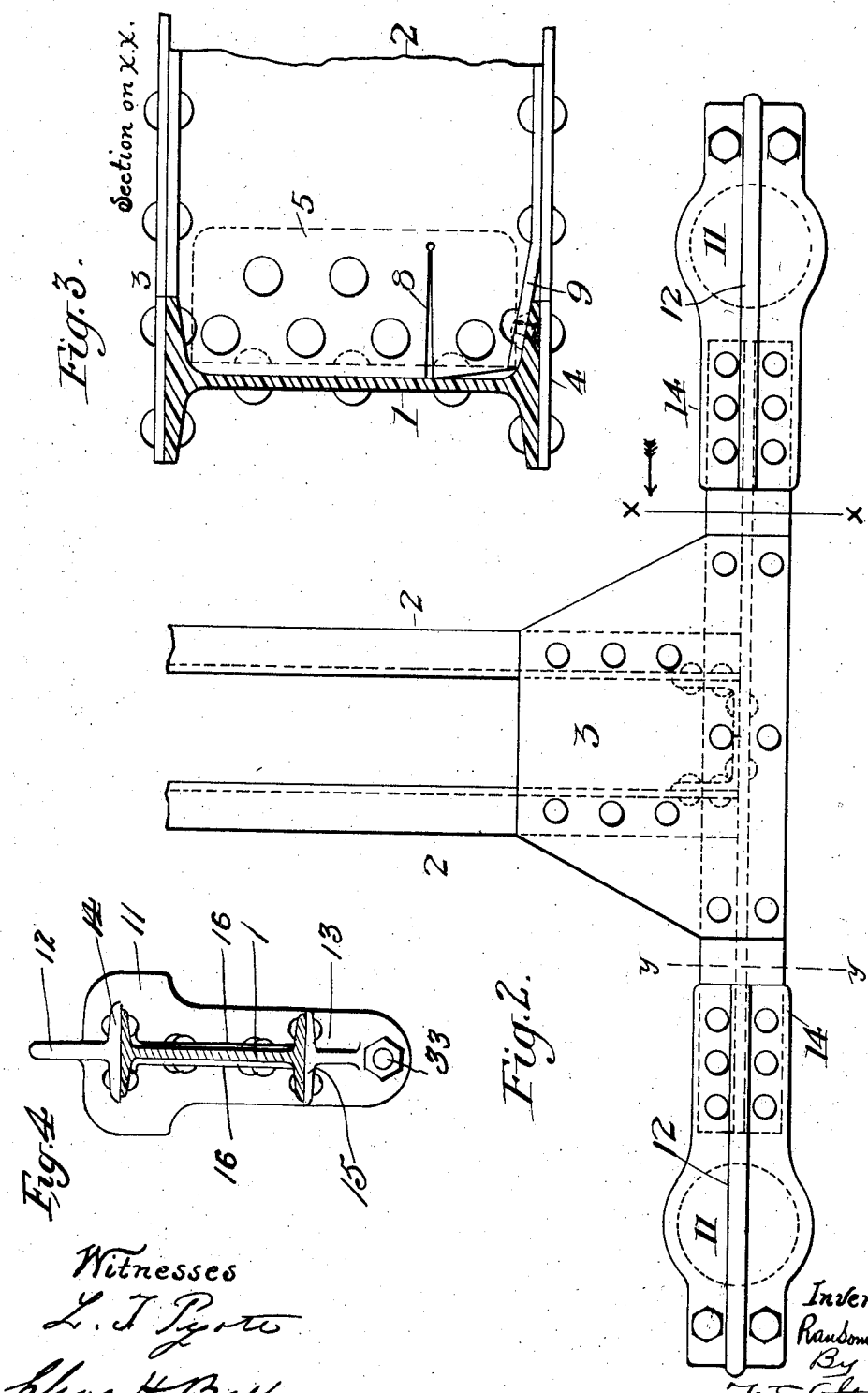

No. 769,370. PATENTED SEPT. 6, 1904.
R. C. WRIGHT & F. E. STEBBINS.
CAR TRUCK.
APPLICATION FILED MAR. 18, 1902.
NO MODEL. 5 SHEETS—SHEET 3.
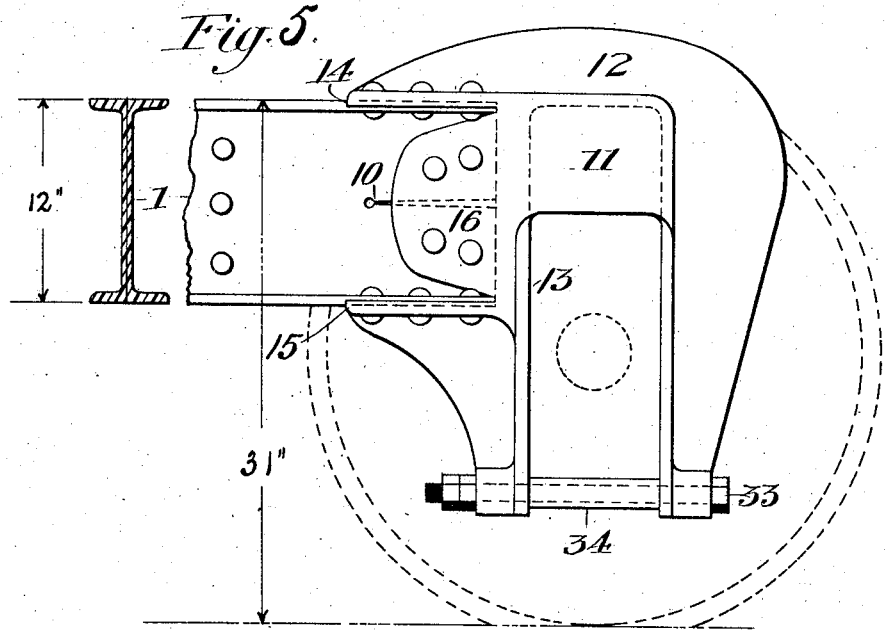
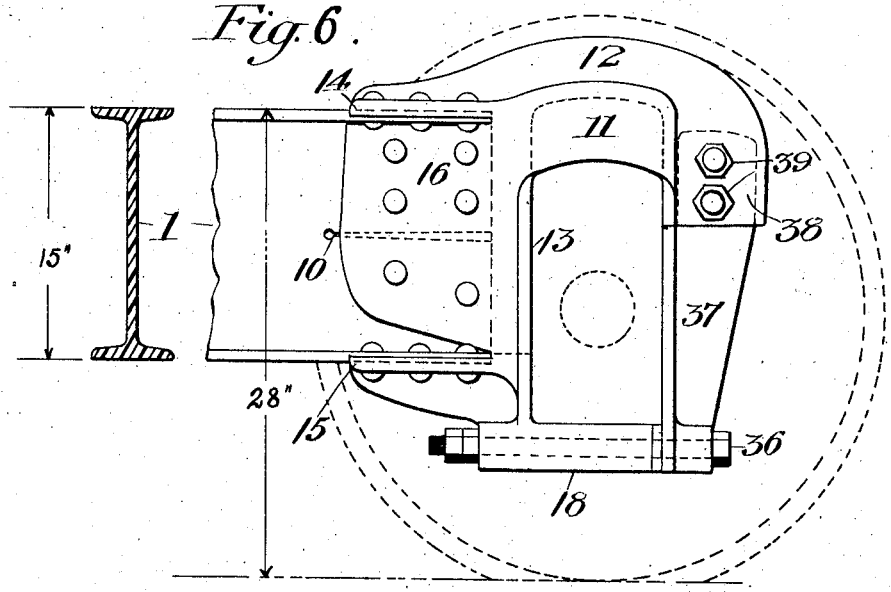
Witnesses
L. J. Pyott
Chas. H. Ball
Inventors
Ransom C. Wright
F. E. Stebbins

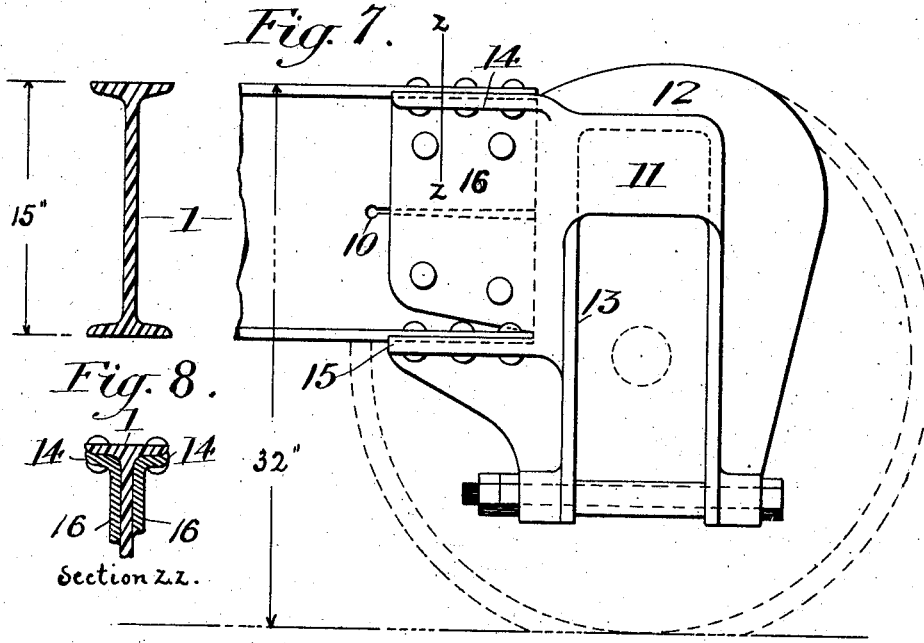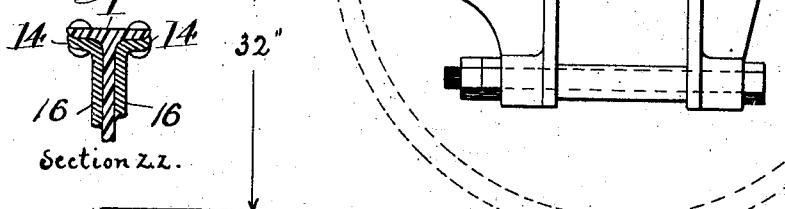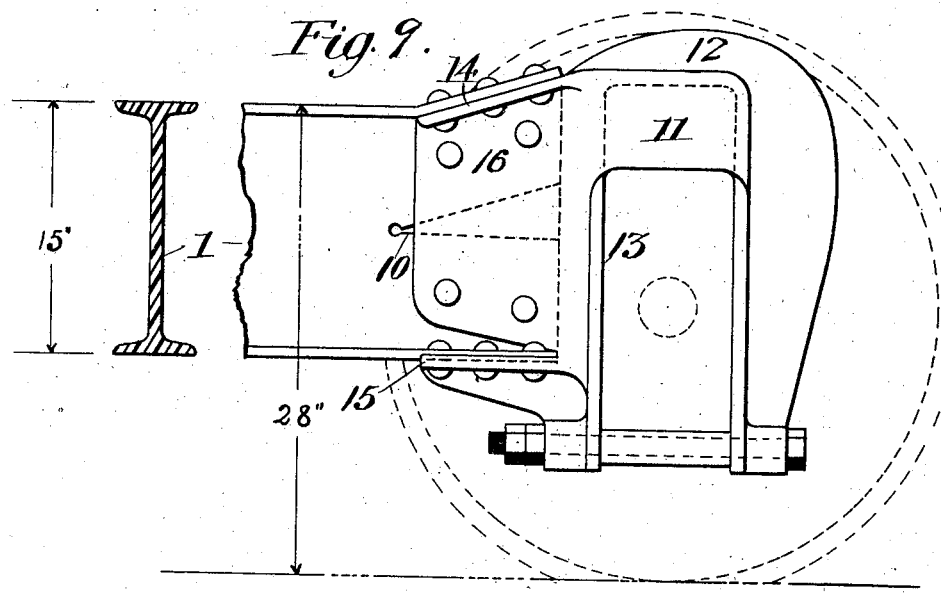

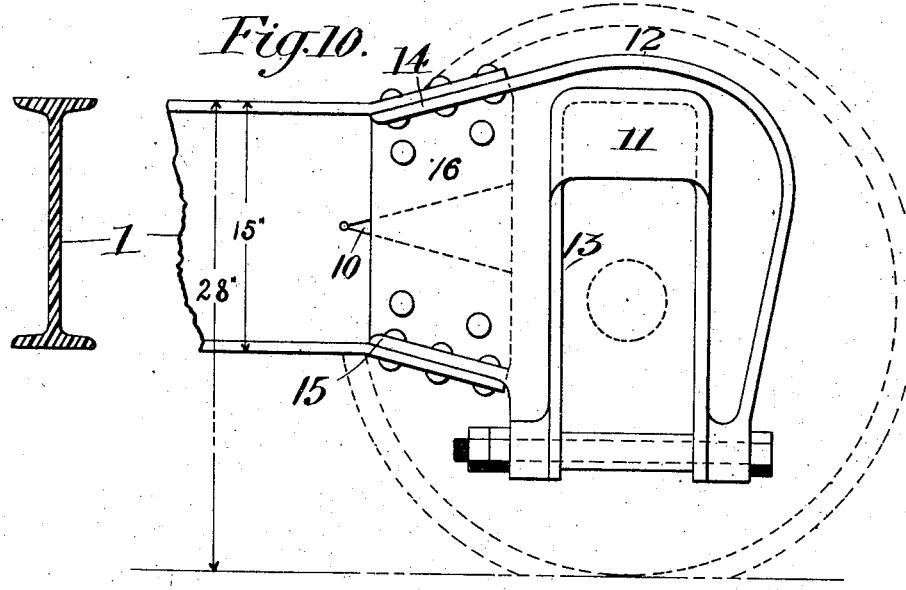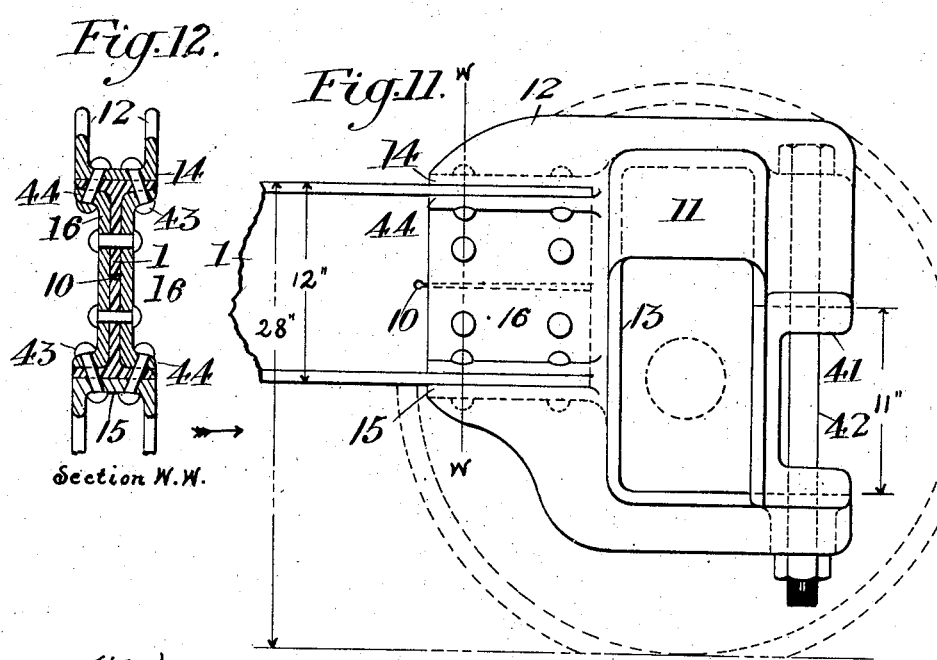

No. 769,370. Patented September 6, 1904.

UNITED STATES PATENT OFFICE.

RANSOM C. WRIGHT, OF PHILADELPHIA, PENNSYLVANIA, AND FRANK E. STEBBINS, OF WASHINGTON, DISTRICT OF COLUMBIA.

CAR-TRUCK.

SPECIFICATION forming part of Letters Patent No. 769,370, dated September 6, 1904.

Application filed March 18, 1902. Serial No. 98,788. (No model.)

*To all whom it may concern:*

Be it known that we, RANSOM C. WRIGHT, residing at Philadelphia, in the county of Philadelphia and State of Pennsylvania, and FRANK E. STEBBINS, residing at Washington, District of Columbia, citizens of the United States, have invented certain new and useful Improvements in Car-Trucks, of which the following is a specification.

The object of our invention is the production of a car-truck frame which can easily and cheaply be constructed in the ordinary car-shop by the use of well-known tools and appliances and which can easily be repaired when necessary.

Our invention consists in certain novelties of construction and arrangements and combinations of parts, substantially as hereinafter set forth and claimed.

The accompanying drawings illustrate several examples of the physical embodiments of our invention constructed according to the best modes we have so far devised for the practical application of the principles.

Figures 1, 2, 3, 4 are views of one example of our truck-frame. Fig. 1 is a view in side elevation. Fig. 2 is a half top plan view. The other half being of the same construction is not shown. Fig. 3 is a section on line $x\ x$ of Fig. 2. Fig. 4 is a section on line $y\ y$ of Fig. 2. Figs. 5 to 12 show examples of cast-metal pedestals of modified shapes and constructions, each secured to the end of an I-beam. Fig. 5 illustrates a cast-metal pedestal secured to an I or double-channel beam I-shaped in cross-section and adapted for use with a car having a relatively high body-bolster. Fig. 6 shows a cast-metal pedestal secured to an I-beam, the outer jaw of the pedestal being removable. Fig. 7 shows a cast-metal pedestal, the top flanges of which are secured by rivets to the under surfaces of the top flanges of an I-beam. Fig. 8 is a section on line $z\ z$ of Fig. 7. Fig. 9 shows a cast-metal pedestal and an I-beam having a part of its end bent upwardly for the purpose of allowing the side frames and transoms to be dropped near the track and to permit the upper flanges of the pedestal-neck to be located below the top flanges of the I-beams. Fig. 10 shows a cast-metal pedestal and an I-beam having its web at the end split and the parts spread so that the neck of the pedestal may fit between the top and bottom flanges of the beam and be riveted to the inner surfaces of the flanges of the beam. Fig. 11 shows a cast-metal pedestal having a removable end piece and secured to the end of an I-beam, the neck of the pedestal having two webs and top and bottom flanges. Fig. 12 is a section of Fig. 11 on line $w\ w$.

The general method of constructing the truck-frame is as follows: Commercial rolled I and channel beams are cut to the required lengths for the side pieces and transoms. Holes are punched or drilled in the webs and flanges of both side pieces and transoms, the transoms united to the side pieces by gusset-plates and connection-angles, rivets being preferably used for the purpose, and cast-metal pedestals of steel or malleable iron, having necks located at right angles to the pedestal-jaws, are secured upon the vertical ends of the side pieces by rivets, which are passed through the flanges and webs of both the pedestal-necks and the ends of the side pieces.

In Figs. 1, 2, and 3 the transoms are shown as of channel-beams with their flanges turned outwardly. The sides and transoms are united by the gusset-plates and the connection-angles, rivets being passed through the flanges and webs of the transoms and sides and the other elements. In Fig. 3 the lower flange of a transom is shown bent upwardly, so as to rest upon the flange of the side piece, and thus take the shearing strains off the rivets.

Referring to the several views, the numeral 1 designates the I-beams; 2, the transoms, which are channel-beams in this instance; 3, top gusset-plates; 4, bottom gusset-plates; 5, connection-angles; 8, slits made in the transom ends; 9, the bottom flanges of the transom ends bent upwardly, and 10 slits made in the ends of the side pieces, as shown.

Seven types or examples of cast-metal pedestals are illustrated. Each has a seat or pocket 11 for the upper end of a helical spring, a strengthening flange or flanges 12 above the bearing or pocket, an inner jaw or bearing-flange 13 for a recessed journal-box, a top flange 14, riveted to the top flange or flanges of the side piece, a bottom flange 15, riveted to the lower flange or flanges of the side piece, and two webs 16, located upon opposite sides of and riveted to the web of the side piece. In all the examples the web of the side piece is shown split, so that the flanges of the side piece may be caused to fit the top and bottom flanges of the pedestal-neck, the end of the beam being expanded or contracted as occasion may require to bring the parts into frictional contact. However, the beams may be integral when so desired and the pedestals caused to engage the surfaces of the ends of the beams when necessary by other means.

In Figs. 1, 2, 3, and 4 the web 16 is provided with a flange 27, through which the rivets pass which unite the top flange 14 to the side piece. The outer pedestal jaw and flange 28 hook over the journal-box 29 and extend part way down the side thereof, a spring 30 being located in the pocket and resting upon the journal-box. The lower portion of leg 31 is perforated, as well as the removable part 32. A removable bolt 33 and thimble or spacing-piece 34 unite the legs 31 and removable part 32, and two bolts 35 join the latter to the end of the outer jaw. By removing the bolts and jacking up the truck-frame a short distance a pair of wheels, with the boxes, may be rolled out. If desired, the lower portion of the jaw or leg may be cast separately, the line of division being on $o$ $o$ and united by rivets to the lower flange of the I-beam.

In Fig. 5 both jaws of the pedestal are integral and perforated, and the bolt 33 and thimble 34 unite them.

In Fig. 6 the lower integral horizontal extension 18 is perforated and receives one or two horizontal bolts 36, which also pass through the perforated lower end of the flange and removable outer jaw 37. The lower horizontal extension may be made separate and secured to the lower flange of the I-beam. The head of the pedestal is provided with a bearing or pocket 38, within which the upper end of jaw 37 is removably secured by bolts 39, as shown.

In Figs. 7 and 8 the neck of the pedestal has two webs 16 16, one on each side of the web of the side piece, and the top flanges fit beneath the flanges of the I-beam, as indicated by Fig. 8.

In Fig. 9 the upper part of the I-beam side piece is bent upwardly and the top flanges of the pedestal-neck located beneath the top flanges of the I-beam, and there is a web 16 on each side similar to those shown in Fig. 8. This construction enables the transom or transoms to be lowered several inches, adapting the same for a car with a low body-bolster.

In Fig. 10 both the top and bottom portions of the end of the I-beam are bent or separated and the top and bottom flanges of the webs of the pedestal-neck are located inside the flanges of the I-beam, as shown.

In Figs. 11 and 12 a removable outer jaw 41 is held in place by a bolt 42, which passes through a perforation in the pedestal-head and also a perforation at the end of the lower horizontal extension. Two bolts may be substituted for the single bolt. At the top and bottom of the neck are two flanges 12, spaced apart to afford sufficient room between them for the driving of the rivets 43, which pass through the flanges of the I-beam and the flanges 44 of the webs each side of the I-beam.

In all the examples of cast-metal pedestals webs, as 16, are located on each side of the I-beam and which are secured to the web of the I-beam by rivets passing through the three webs. The use of these webs on both sides of the neck adds the requisite strength adjacent the inner bearing flange or jaw for the journal-box and provides for a secure attachment of the pedestal-neck to the side piece by rivets. The top and bottom flanges of the pedestal-neck are also secured to the top and bottom flanges of the end of an I-beam, as shown, and the number and disposition of the rivets may be varied to suit the particular shape of the flanges. Each pedestal may be cast in several pieces and united to the I-beam, as previously indicated or otherwise. By splitting the ends of the side pieces the flanges of the pedestal-necks, which in casting may become slightly distorted or be of slightly varying dimensions, can be caused to frictionally engage the flanges of the side pieces and a secure union be effected.

From the foregoing description, taken in connection with the drawings, it becomes obvious that by our method of procedure truck-frames may be cheaply produced and that they will possess characteristics of construction that will allow of easy and cheap repair in the ordinary car-shop.

While we have shown specific construction of pedestals, modifications thereof may in practice be introduced. In place of the integral bearing or pocket 11 may be substituted a removable bearing or pocket, and when the bearing or pocket is integral with the pedestal the flange above the same may be omitted. In place of the integral I-beams may be used a composite side piece I-shaped in cross-section. Any suitable center and side bearings may be used in connection with the transom or transoms for supporting the end of a car-body. Each of the six examples shown by Figs. 5 to 12, inclusive, has sides I-shaped in cross-section and united adjacent their centers by flanged transoms, connection-angles, and gusset-plates similar to the first example, and therefore the frames are not shown complete. The locations of the holes for the rivets in the several elements of the seven examples are clear from the drawings, but, as previously indicated, they may be differently disposed.

What we claim is—

1. The combination in a truck-frame structure, of a transom or transoms located between the pairs of wheels and adapted to support a car-body; two I-beam side pieces united at points between their ends directly to the ends of the transom or transoms, each end of each side piece having its flanges and web provided with holes; and cast-metal pedestals each having an outer jaw and an inner jaw with bearing-flanges, a neck or extension at right angles to the jaws with a perforated top flange a perforated bottom flange and two webs, and said pedestals secured to the vertical ends of the side pieces by rivets which pass through the top and bottom flanges and webs of each pedestal-neck and end of the side piece; and detachable means for closing the journal-box openings in the pedestals.

2. The combination in a truck-frame structure, of a transom or transoms located between the pairs of wheels and adapted to support the end of a car-body; two I-beam side pieces united at points between their ends directly to the ends of a transom or transoms, each end of each side piece having its upper flange and web provided with holes; and cast-metal pedestals each having an outer jaw and an inner jaw with bearing-flanges, a neck or extension at right angles to the jaws with a perforated top flange and two webs, and said pedestals secured to the vertical ends of the side pieces by rivets which pass through the top flanges and webs of each pedestal-neck and end of a side piece; and detachable means for closing the journal-box openings in the pedestals.

3. The combination in a truck-frame structure, of a transom or transoms located between the pairs of wheels and adapted to support the end of a car-body; two I-beam side pieces united at points between their ends directly to the transom or transoms each end of each side piece having its bottom flange and web provided with holes; and cast-metal pedestals each having an outer jaw and an inner jaw with bearing-flanges, a neck or extension at right angles to the jaws with a perforated bottom flange and two webs, and said pedestals secured to the vertical ends of the side pieces by rivets which pass through the bottom flanges and webs of each pedestal-neck and end of a side piece; and detachable means for closing the journal-box openings in the pedestals.

4. The combination in a truck-frame structure, of a transom or transoms located between the pairs of wheels and adapted to support the end of a car-body; two I-beam side pieces united at points between their ends directly to the ends of the transom or transoms, each end of each side piece having its flanges and web provided with holes; gusset-plates riveted to the flanges of the side pieces and transom or transoms; and cast-metal pedestals each having an outer jaw and an inner jaw with bearing-flanges, a neck or extension at right angles to the jaws with a perforated top flange a perforated bottom flange and two webs, and said pedestals secured to the vertical ends of the side pieces by rivets which pass through the top and bottom flanges and webs of each pedestal-neck and end of a side piece; and detachable means for closing the journal-box openings in the pedestals.

5. The combination in a truck-frame structure, of a transom or transoms located between the pairs of wheels and adapted to support the end of a car-body; two I-beam side pieces united at points between their ends directly to the ends of the transom or transoms, each end of each side piece having its upper flange and web provided with holes; gusset-plates riveted to the flanges of the side pieces and transom or transoms; and cast-metal pedestals each having an outer jaw and an inner jaw with bearing-flanges, a neck or extension at right angles to the jaws with a perforated top flange and two webs, and said pedestals secured to the vertical ends of the side pieces by rivets which pass through the top flanges and webs of each pedestal-neck and end of a side piece; and detachable means for closing the journal-box openings in the pedestals.

6. The combination in a truck-frame structure, of a transom or transoms located between the pairs of wheels and adapted to support the end of a car-body; two I-beam side pieces united at points between their ends directly to the ends of the transom or transoms, each end of each side piece having its bottom flange and web provided with holes; gusset-plates united to the flanges of the side pieces and transom or transoms; and cast-metal pedestals each having an outer jaw and an inner jaw with bearing-flanges, a neck or extension at right angles to the jaws with a perforated bottom flange and two webs, and said pedestals secured to the vertical ends of the side pieces by rivets which pass through the bottom flanges and webs of each pedestal-neck and end of a side piece; and detachable means of closing the journal-box openings in the pedestals.

7. The combination in a truck-frame structure, of a transom or transoms located between the pairs of wheels and adapted to support the end of a car-body; two I-beam side pieces united at points between their ends directly to the ends of the transom or transoms, each end of each side piece having its flanges and web provided with holes; and cast-metal pedestals each having an outer jaw and an inner jaw with bearing-flanges, a seat or bearing for a spring, a neck or extension at right angles to the jaws with a perforated top flange a perforated bottom flange and two webs, and said pedestals secured to the vertical ends of the side pieces by rivets which pass through the top and bottom flanges and webs of each pedestal-neck and end of a side piece; and detachable means for closing the journal-box openings in the pedestals.

8. The combination in a truck-frame structure, of a transom or transoms located between the pairs of wheels and adapted to support the end of a car-body; two I-beam side pieces united at points between their ends directly to the ends of the transom or transoms, each end of each side piece having its upper flange and web provided with holes; and cast-metal pedestals each having an outer jaw and an inner jaw with bearing-flanges, a seat or bearing for a spring, a neck or extension at right angles to the jaws with a perforated top flange and two webs, and said pedestals secured to the vertical ends of the side pieces by rivets which pass through the top flanges and webs of each pedestal-neck and end of a side piece; and detachable means for closing the journal-box openings in the pedestals.

9. The combination in a truck-frame structure, of a transom or transoms located between the pairs of wheels and adapted to support the end of a car-body; two I-beam side pieces united at points between their ends directly to the ends of a transom or transoms, each end of each side piece having its bottom flange and web provided with holes; and cast-metal pedestals each having an outer jaw and an inner jaw with bearing-flanges, a seat or bearing for a spring, a neck or extension at right angles to the jaws and a perforated bottom flange and two webs and said pedestals secured to the vertical ends of the side pieces by rivets which pass through the bottom flanges and webs of each pedestal-neck and end of a side piece; and detachable means for closing the journal-box openings in the pedestals.

10. The combination in a truck-frame structure, of a transom or transoms located between the pairs of wheels and adapted to support the end of a car-body; two I-beam side pieces united at points between their ends directly to the ends of a transom or transoms, each end of each side piece having its flanges and web provided with holes; and cast-metal pedestals each having an outer jaw and an inner jaw with bearing-flanges, an integral pocket for a spring, a neck or extension at right angles to the jaws with a perforated top flange perforated bottom flange and two webs, and said pedestals secured to the vertical ends of the side pieces by rivets which pass through the top and bottom flanges and webs of each pedestal-neck and end of a side piece; and detachable means for closing the journal-box openings in the pedestals.

11. The combination in a truck-frame structure, of a transom or transoms located between the pairs of wheels and adapted to support the end of a car-body; two I-beam side pieces united at points between their ends directly to the ends of a transom or transoms, each end of each side piece having its upper flange and web provided with holes; and cast-metal pedestals each having an outer jaw and an inner jaw with bearing-flanges, an integral pocket for a spring, a neck or extension at right angles to the jaws, with a perforated top flange and two webs, and said pedestals secured to the vertical ends of the side pieces by rivets which pass through the top flanges and webs of each pedestal-neck and end of a side piece; and detachable means for closing the journal-box openings in the pedestals.

12. The combination in a truck-frame structure, of a transom or transoms located between the pairs of wheels and adapted to support the end of a car-body; two I-beam side pieces united at points between their ends directly to the ends of the transom or transoms, each end of each side piece having its bottom flange and web provided with holes; and cast-metal pedestals each having an outer jaw and an inner jaw with bearing-flanges, an integral pocket for a spring, a neck or extension at right angles to the jaws with a perforated bottom flange and two webs, and said pedestals secured to the vertical ends of the side pieces by rivets which pass through the bottom flanges and webs of each pedestal-neck and end of a side piece; and detachable means for closing the journal-box openings in the pedestals.

13. The combination in a truck-frame structure, of two flanged beam-transoms located between the pairs of wheels and adapted to support the end of a car-body; two I-beam side pieces united at points between their ends directly to the ends of the flanged transom-beams by gusset-plates and connection-angles, each end of each side piece having its flanges and web provided with holes; and cast-metal pedestals each having an outer jaw and an inner jaw with bearing-flanges, a neck or extension at right angles to the jaws with a perforated top flange a perforated bottom flange and two webs, and said pedestals secured to the vertical ends of the side pieces by rivets which pass through the top and bottom flanges and webs of each pedestal-neck and end of a side piece; and detachable means for closing the journal-box openings in the pedestals.

14. The combination in a truck-frame structure, of two flanged beam-transoms located between the pairs of wheels and adapted to support the end of a car-body; two I-beam side pieces united at points between their ends directly to the ends of the flanged transom-beams by gusset-plates and connection-angles, each end of each side piece having its upper flange and web provided with holes; and cast-metal pedestals each having an outer jaw and an inner jaw with bearing-flanges, a neck or extension at right angles to the jaws with a perforated upper flange and two webs, and said pedestals secured to the vertical ends of the side pieces by rivets which pass through the upper flanges and webs of each pedestal-neck and end of a side piece; and detachable means for closing the journal-box openings in the pedestals.

15. The combination in a truck-frame structure, of two flanged beam-transoms located between the pairs of wheels and adapted to support the end of a car-body; two I-beam side pieces united at points between their ends directly to the ends of the flanged transom-beams by gusset-plates and connection-angles, each end of each side piece having its bottom flange and web provided with holes; and cast-metal pedestals each having an outer jaw and an inner jaw with bearing-flanges, a neck or extension at right angles to the jaws with a perforated bottom flange and two webs, and said pedestals secured to the vertical ends of the side pieces by rivets which pass through the bottom flanges and webs of each pedestal-neck and end of a side piece; and detachable means for closing the journal-box openings in the pedestals.

16. The combination with a truck-frame having flanged side pieces united adjacent their centers, of cast-metal pedestals, each having outer and inner flanged jaws, a neck or extension at right angles to the jaws provided with a top flange a bottom flange and two webs, and means for closing the opening between the jaws; the said neck being riveted to a side piece independent of a transom and with rivets passed through the flanges of the neck and side piece.

17. The combination with a truck-frame having flanged side pieces united adjacent their centers, of cast-metal pedestals each having outer and inner flanged jaws, a neck or extension at right angles to the jaws provided with a top flange a bottom flange and two webs, and a bearing or seat for a spring, the said neck being riveted to a side piece independent of a transom and with rivets passed through the flanges of the neck and side piece.

18. The combination with a truck-frame having flanged side pieces united adjacent their centers, of cast-metal pedestals, each having outer and inner flanged jaws, a neck or extension at right angles to the jaws provided with a top flange a bottom flange and two webs, and a pocket for a spring cast integral with the pedestal; the said neck being riveted to a side piece independent of a transom and with rivets passed through the flanges of the neck and side piece.

19. A cast-metal pedestal having outer and inner flanged jaws, a neck or extension at right angles to the jaws provided with a top flange, a bottom flange and two webs, and an outer detachable end portion of the pedestal to facilitate the removal of the journal-box; the inner flanged jaw, webs and head of the pedestal being integral.

20. A cast-metal pedestal having outer and inner flanged jaws, a neck or extension at right angles to the jaws provided with a top flange, a bottom flange and two webs, a seat for a spring, and a flange above the seat.

21. The combination with a truck-frame having flanged sides united adjacent their centers, of cast-metal pedestals, each having outer and inner flanged jaws, a neck or extension at right angles to the jaws provided with a top flange and two webs, and means for closing the opening for the journal-box; the top flange, webs and head of the pedestal being integral and the neck or extension being secured to a side piece independent of a transom and by rivets which pass through the top flange and flange of the side piece.

22. A cast-metal pedestal having outer and inner flanged jaws, and a neck or extension at right angles to the jaws provided with a bottom flange and two webs, the inner flanged jaw, webs, and head of the pedestal being integral, combined with the flanged end of a truck-frame side piece and riveted thereto only and independent of a transom with rivets passed through the bottom flanges of the neck and side piece.

23. A cast-metal pedestal having outer and inner flanged jaws, a neck or extension at right angles to the jaws provided with a top flange, a bottom flange and two webs, a seat or bearing for a spring, and a horizontal extension; said outer jaw being removable, and the inner flanged jaw and head of the pedestal being integral.

24. The combination in a car-truck frame, of side pieces I-shaped in cross-section; a flanged transom or transoms uniting the side pieces adjacent their centers; and cast-metal pedestals each having an inner flange or wall 13, a seat or pocket for a spring, two webs, and top and bottom flanges secured to the top and bottom flanges of the side pieces; said top flange, bearing flange or wall, webs, and spring seat or pocket of a pedestal being integral, and said pedestals secured to the side pieces independent of a transom.

25. The combination in a car-truck frame, of side pieces I-shaped in cross-section; a transom or transoms uniting the side pieces adjacent their centers; and cast-metal pedestals each having an inner bearing flange or wall 13, an outer flanged jaw, a seat or pocket for a spring, top and bottom flanges and webs secured to the top and bottom flanges and webs of the side pieces; said top flange, inner bearing flange or wall, spring seat or pocket and webs of a pedestal being integral, and said pedestals secured to the side pieces independent of a transom.

26. The combination in a car-truck frame, of side pieces I-shaped in cross-section; a transom or transoms uniting the side pieces adjacent their centers; and cast-metal pedestals each having an inner bearing flange or wall 13, top flange and two webs secured to the flanges and webs of the side piece; said inner bearing flange or wall, top flange, and webs of a pedestal being integral, and said pedestals secured to the side pieces independent of a transom.

27. The combination in a car-truck frame, of side pieces I-shaped in cross-section; a transom or transoms uniting the side pieces adjacent their centers; and cast-metal pedestals each having two webs engaging the side of the I-beam, and top and bottom flanges secured to the top and bottom flanges of the side piece by rivets passed through the flanges of the pedestal and side piece, and said pedestals secured to the side pieces independent of a transom.

28. The combination in a car-truck frame of side pieces I-shaped in cross-section; a transom or transoms uniting the side pieces adjacent their centers by top plates and connection-angles; and cast-metal pedestals each formed with a spring-seat, bearing wall or flange 13 and having top and bottom flanges and webs; said pedestals being secured to the top and bottom flanges of the side pieces by rivets and independent of a transom, and each pedestal located at the end of a side piece so that the bearing flange or wall 13 will be in a perpendicular plane beyond the end of a side piece.

29. The combination in a car-truck frame, of flanged side pieces having their ends cut off in substantially vertical lines and their webs split; a transom or transoms rigidly uniting the side pieces adjacent their centers; and cast-metal pedestals secured upon the vertical ends of the side pieces.

30. The combination in a car-truck frame, of flanged side pieces having their webs split; a transom or transoms; and cast-metal pedestals having top and bottom flanges secured to the flanges of the side pieces upon their vertical ends.

31. The combination with the flanged side pieces of a truck-frame having slits at their ends, of cast-metal pedestals provided with top and bottom flanges and a web, and said pedestals secured to the flanges and webs of the side pieces.

32. The combination in a car-truck frame, of flanged side pieces and flanged transoms; the said transoms having their webs split at the ends and the lower flanges bent upwardly so as to rest upon the lower flanges of the side pieces to which the said transoms are secured by gusset-plates and connection-angles.

33. The combination with a flanged beam having its end cut off in a substantially vertical line and its web split, of a cast-metal pedestal having flanged jaws and a neck secured upon the vertical end of the beam.

34. The cast-metal pedestal having a bearing flange or wall 13, a spring seat or pocket, a bottom flange and two webs and cast integral, and an outer removable flanged jaw.

35. The combination with an I-beam, of a cast-metal pedestal having a bearing flange or wall 13, a spring seat or pocket, two webs, and a top flange all cast integral, and a lower flange secured to the lower flange of the I-beam; said pedestal being riveted in position independent of a transom.

36. The combination in a truck-frame of flanged transoms; flanged side pieces with their ends cut off through the webs and flanges, the ends of the transoms abutting the webs of the side pieces adjacent their centers and at right angles thereto; connection-angles riveted to the webs of the transoms and the webs of the side pieces; gusset-plates uniting the flanges of the transoms and flanges of the side pieces by means of rivets; and metal pedestals secured upon the vertical ends of the side pieces by rivets; the pedestals projecting beyond the ends of the side pieces and the lower flanges of the side pieces being in a horizontal plane or planes below the tops of the journal-boxes, whereby the thrusts and blows of the journal-boxes will be taken in direct lines by the side pieces.

In testimony whereof we affix our signatures in presence of two witnesses.

RANSOM C. WRIGHT.
FRANK E. STEBBINS.

Witnesses as to Ransom C. Wright:
   WILLIAM C. STOEVER,
   LIZZIE REIFF.

Witnesses as to Frank E. Stebbins:
   B. OLIVE,
   WM. H. DE LACY.